(12) United States Patent
Kato et al.

(10) Patent No.: US 11,977,503 B2
(45) Date of Patent: May 7, 2024

(54) CONTROL DEVICE, ONBOARD SYSTEM, CONTROL METHOD, AND NON-TRANSITORY COMPUTER-READABLE RECORDING MEDIUM

(71) Applicant: TOYOTA JIDOSHA KABUSHIKI KAISHA, Toyota (JP)

(72) Inventors: Yusuke Kato, Toyota (JP); Seigo Takai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/569,585

(22) Filed: Jan. 6, 2022

(65) Prior Publication Data

US 2022/0245076 A1 Aug. 4, 2022

(30) Foreign Application Priority Data

Jan. 29, 2021 (JP) ................ 2021-013237

(51) Int. Cl.
*G06F 13/364* (2006.01)
*G06F 13/16* (2006.01)
*G06F 13/40* (2006.01)

(52) U.S. Cl.
CPC ........ *G06F 13/364* (2013.01); *G06F 13/1668* (2013.01); *G06F 13/4068* (2013.01)

(58) Field of Classification Search
None
See application file for complete search history.

(56) References Cited

U.S. PATENT DOCUMENTS

2014/0068099 A1* 3/2014 Komori ................ H04L 45/745
  709/236
2020/0204396 A1* 6/2020 Kobayashi ............ B60R 16/023

FOREIGN PATENT DOCUMENTS

JP    2016-092484 A    5/2016
JP    2017-163344 A    9/2017

* cited by examiner

*Primary Examiner* — Farley Abad
*Assistant Examiner* — Dayton Lewis-Taylor
(74) *Attorney, Agent, or Firm* — Oliff PLC (57) ABSTRACT

A control device includes a memory, and a processor coupled to the memory, to a first communication bus, and to a second communication bus, the processor being configured to control whether or not to relay data communicated using the first communication bus to the second communication bus, and in a case in which a request has been received for data communicated using the first communication bus, execute switching so as to relay data received from the first communication bus to the second communication bus.

6 Claims, 10 Drawing Sheets

| RELAY DATA |
|---|
| CAN ID: 0030 |
| CAN ID: 0031 |

| Relay data | CAN ID: 0030 | CAN ID: 0031 | CAN ID: 0032 |

FIG.9

CONTROL DEVICE, ONBOARD SYSTEM, CONTROL METHOD, AND NON-TRANSITORY COMPUTER-READABLE RECORDING MEDIUM

CROSS-REFERENCE TO RELATED APPLICATION

This application is based on and claims priority under 35 USC 119 from Japanese Patent Application No. 2021-013237 filed on Jan. 29, 2021, the disclosure of which is incorporated by reference herein.

BACKGROUND

Technical Field

The present disclosure relates to a control device, an onboard system, a control method, and a non-transitory computer-readable recording medium.

Related Art

Controller area networks (CAN) have been employed for communication between electronic control units (ECUs) in in-vehicle onboard systems for some time. As vehicles adapt to Connected, Autonomous, Shared & Services, Electric (CASE) technologies, onboard systems are increasingly communicating using multiple communication protocols such as Ethernet (registered trademark), in addition to CANs.

In CAN networks, the communication performed is statically decided, and this form of communication may be described as signal-oriented communication. In Ethernet networks, the communication performed is dynamically decided, and this form of communication has been described as service-oriented communication. In onboard systems that employ both CAN and Ethernet technology, signal-to-service conversion functionality is employed in cases in which CAN-based communication data is also employed as Ethernet-based communication data.

Japanese Patent Application Laid-Open (JP-A) No. 2017-163344 discloses technology in which a communication method is converted so as to enable communication between ECUs in an onboard system employing multiple protocols.

However, the technology disclosed in JP-A No. 2017-163344 is concerned solely with converting the communication method, and is not capable of dynamically changing configuration contents regarding communications to be relayed, even in cases in which configuration contents have changed due to the addition of an ECU, ECU functionality updates, or the like.

SUMMARY

An aspect of the disclosure is a control device that includes a memory, and a processor coupled to the memory, to a first communication bus, and to a second communication bus. The processor is configured to control whether or not to relay data communicated using the first communication bus to the second communication bus, and in a case in which a request has been received for data communicated using the first communication bus, execute switching so as to relay the data as received from the first communication bus to the second communication bus.

BRIEF DESCRIPTION OF THE DRAWINGS

Exemplary embodiments of the present disclosure will be described in detail based on the following figures, wherein.

DETAILED DESCRIPTION

Explanation follows regarding an example of an exemplary embodiment of the present disclosure, with reference to the drawings. Note that the same reference numerals are allocated to the same or equivalent configuration elements and sections in the respective drawings. The dimensional proportions in the drawings may be exaggerated to aid explanation and may therefore differ from the actual proportions.

Figure 1:
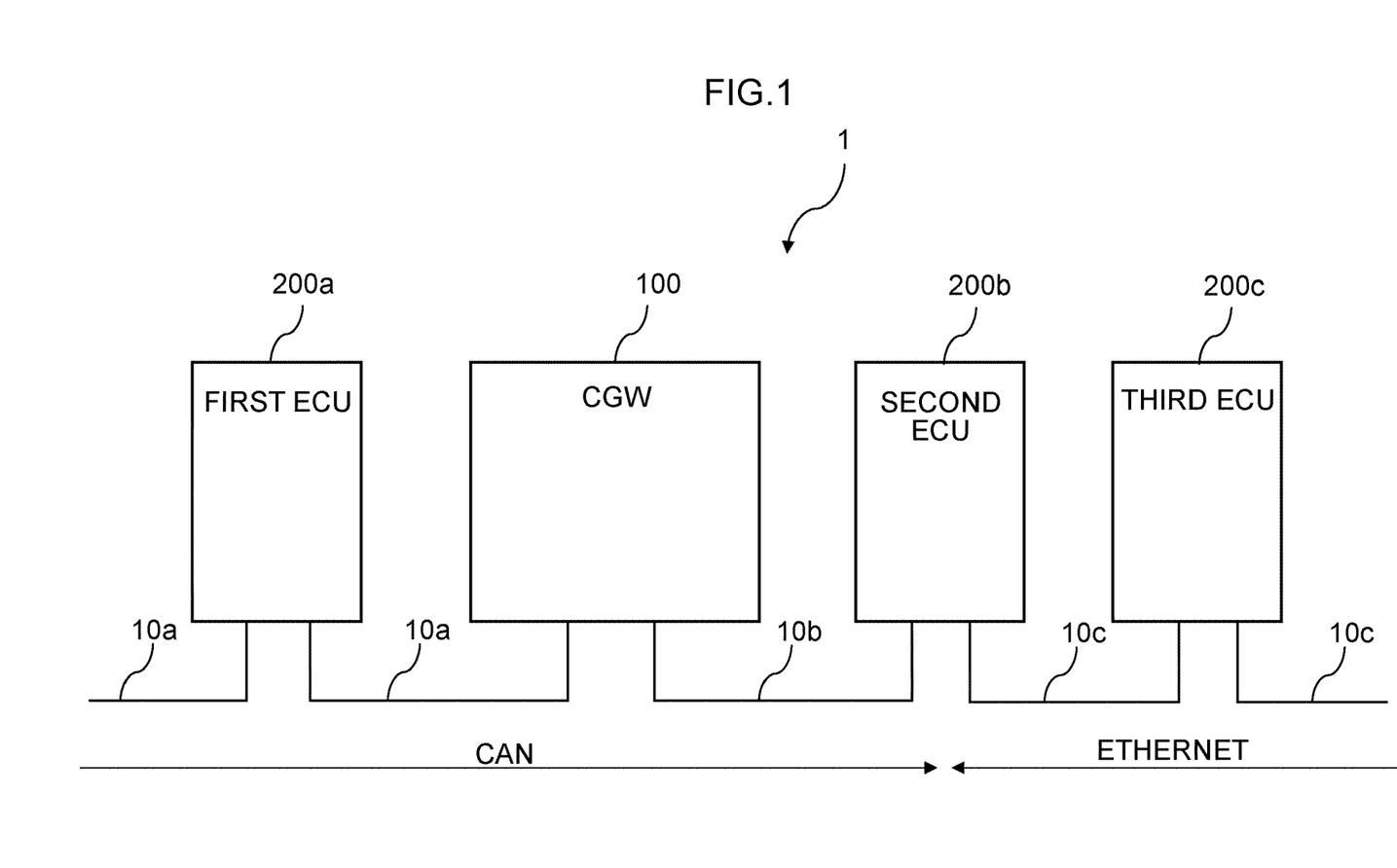
FIG. 1 is a diagram schematically illustrating a configuration of an onboard system according to an exemplary embodiment.

FIG. 1 is a diagram schematically illustrating configuration of an onboard system according to the present exemplary embodiment. As illustrated in FIG. 1, an onboard system 1 includes a central gateway (CGW) 100, a first ECU 200a, a second ECU 200b, and a third ECU 200c. The CGW 100 and the first ECU 200a are connected together by a first communication bus 10a. The CGW 100 and the second ECU 200b are connected together by a second communication bus 10b. The second ECU 200b and the third ECU 200c are connected together by a third communication bus 10c.

The first communication bus 10a and the second communication bus 10b are buses that carry signals corresponding to the same communication protocol. The third communication bus 10c is a bus that carries signals corresponding to a different communication protocol to that of the first communication bus 10a and the second communication bus 10b. In the present exemplary embodiment, the first communication bus 10a and the second communication bus 10b are communication buses compatible with CAN signals, whereas the third communication bus 10c is a communication bus compatible with Ethernet signals. The CGW 100 and the first ECU 200a to the third ECU 200c operate using an onboard battery as a power source.

Although the only ECU connected to the first communication bus 10a in FIG. 1 is the first ECU 200a, other ECUs may also be connected to the first communication bus 10a. Similarly, ECUs other than the second ECU 200b may also be connected to the second communication bus 10b. Moreover, ECUs other than the third ECU 200c may also be connected to the third communication bus 10c.

The CGW 100 is configured by a type of ECU, and has a function of relaying communications between the respective communication buses in the onboard system 1. The CGW 100 is an example of a control device of the present disclosure. Namely, the CGW 100 has a function of relaying data passed between ECUs. For example, the CGW 100 has a function of controlling whether or not data communicated over the first communication bus 10*a* is relayed to the second communication bus 10*b*.

Figure 2:
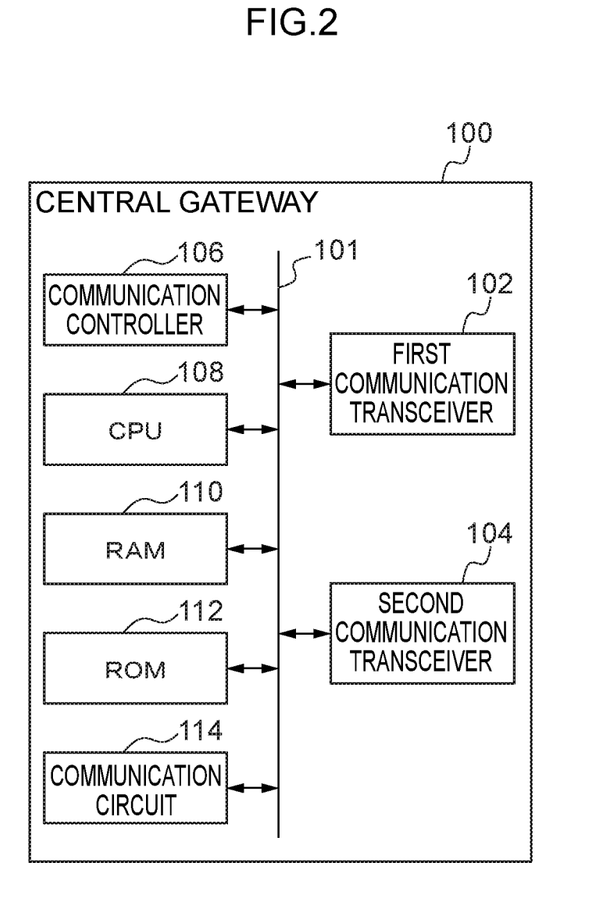
FIG. 2 is a block diagram illustrating a hardware configuration of a CGW.

FIG. 2 is a block diagram illustrating a hardware configuration of the CGW 100.

As illustrated in FIG. 2, the CGW 100 includes a first communication transceiver 102, a second communication transceiver 104, a communication controller 106, a CPU 108, RAM 110, ROM 112, and a communication circuit 114. The first communication transceiver 102, the second communication transceiver 104, the communication controller 106, the CPU 108, the RAM 110, the ROM 112, and the communication circuit 114 are connected together by a bus 101.

The communication controller 106 controls the transmission and reception of data by the first communication transceiver 102 and the second communication transceiver 104. The CPU 108 controls the overall CGW 100. The ROM 112 holds a gateway program executed by the CPU 108. The RAM 110 is an example of memory, and is utilized as a work area for the CPU 108 during execution of control by the CGW 100.

The first communication transceiver 102 is connected to the first communication bus 10*a*. Under the control of a communication driver, the first communication transceiver 102 transmits data from the communication circuit 114 into the first communication bus 10*a*, and receives data for input to the communication circuit 114 through the first communication bus 10*a*. The first communication transceiver 102 thereby exchanges signals with the first ECU 200*a*.

The communication circuit 114 performs serial communication with the first ECU 200*a* via the first communication bus 10*a*, and performs serial communication with the second ECU 200*b* via the second communication bus 10*b*. The communication circuit 114 transmits data from the CPU 108 through either the first communication transceiver 102 or the second communication transceiver 104, and also inputs data input through the first communication transceiver 102 or the second communication transceiver 104 to the CPU 108.

The CPU 108 is an example of a hardware processor that executes processing to control the overall CGW 100, including communication processing executed by the communication circuit 114.

When the gateway program is executed, the CGW 100 uses the above-described hardware resources to implement various functions. Explanation follows regarding functional configuration implemented by the CGW 100.

Figure 3:
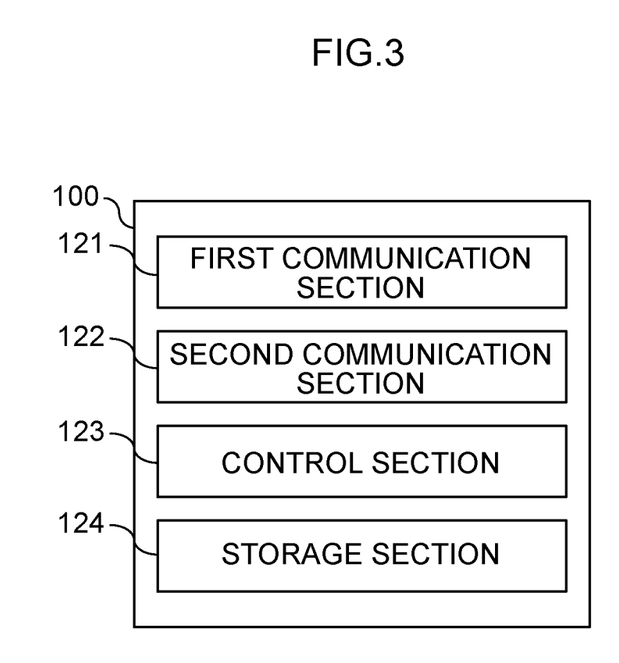
FIG. 3 is a block diagram illustrating an example of a functional configuration of a CGW.

FIG. 3 is a block diagram illustrating an example of the functional configuration of the CGW 100.

As illustrated in FIG. 3, the CGW 100 includes a first communication section 121, a second communication section 122, a control section 123, and a storage section 124 as functional configuration. The respective functional configuration is implemented by the CPU 108 reading and executing the gateway program stored in the ROM 112.

The first communication section 121 communicates with the first ECU 200*a* connected to the first communication bus 10*a*. The second communication section 122 communicates with the second ECU 200*b* connected to the second communication bus 10*b*.

The control section 123 controls operation of the CGW 100, as well as operation of the first ECU 200*a* and the second ECU 200*b* that are electrically connected to the CGW 100. In the present exemplary embodiment, the control section 123 controls whether or not data communicated using the first communication bus 10*a* is relayed to the second communication bus 10*b*. In cases in which the control section 123 has received a request for data communicated using the first communication bus 10*a*, the control section 123 executes switching so as to relay data received by the first communication section 121 to the second communication bus 10*b*.

The storage section 124 stores information relating to data relay by the control section 123. For example, the storage section 124 stores information relating to routing of data communicated over the first communication bus 10*a* and the second communication bus 10*b*. More specifically, the storage section 124 stores identification information for the data communicated using the first communication bus 10*a* in a routing table in association with information regarding whether or not this data is to be relayed to the second communication bus 10*b*. The routing table is an example of management information of the present disclosure.

Figure 4:
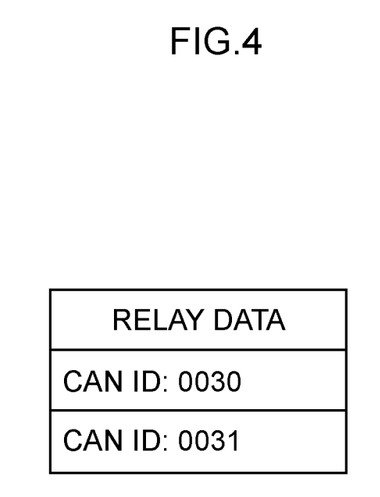
FIG. 4 is a diagram illustrating an example of information stored in a storage section of a CGW.

FIG. 4 is a diagram illustrating an example of the routing table stored in the storage section 124. In FIG. 4, a CAN ID serves as data identification information. FIG. 4 indicates that data with the CAN ID: 0030 and data with the CAN ID: 0031 is to be routed from the first communication bus 10*a* to the second communication bus 10*b*, or vice versa. Namely, data other than the data with the CAN IDs illustrated in FIG. 4 is not to be routed from the first communication bus 10*a* to the second communication bus 10*b*, or vice versa.

The control section 123 may update the routing table stored in the storage section 124 in cases in which the control section 123 receives a request for data communicated using the first communication bus 10*a*. After updating the routing table stored in the storage section 124 such that the requested data can be relayed, the control section 123 may then delete the information relating to this data from the routing table in cases in which there has been no request for this data for a predetermined duration or longer.

As a request for data communicated using the first communication bus 10*a*, the second communication section 122 is capable of receiving information including both identification information and data. The control section 123 then refers to the routing table stored in the storage section 124. If the identification information is registered in the routing table, the control section 123 executes switching so as to relay the data received by the first communication section 121 to the second communication bus 10*b*.

Due to having the configuration illustrated in FIG. 3, the CGW 100 is able to dynamically change the configuration content of communication relayed from the first communication bus 10*a* to the second communication bus 10*b*.

Figure 5:
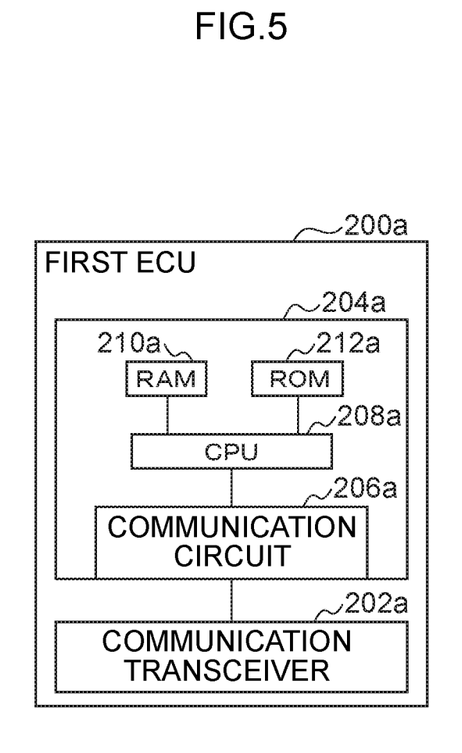
FIG. 5 is a diagram illustrating an example of a hardware configuration of a first ECU.

Next, explanation follows regarding a hardware configuration of the first ECU 200*a*.

FIG. 5 is a diagram illustrating an example of the hardware configuration of the first ECU 200*a*.

As illustrated in FIG. 5, the first ECU 200*a* includes a communication transceiver 202*a*, and a microcontroller 204*a*. A communication circuit 206*a*, a CPU 208*a*, RAM 210*a*, and ROM 212*a* are installed to the microcontroller 204*a*. The CPU 208*a* controls the overall first ECU 200*a*. The RAM 210*a* is an example of memory, and is utilized as a work area for the CPU 208*a* when controlling the first ECU 200*a*. The ROM 212*a* stores a first ECU program executed by the CPU 208*a*.

The communication transceiver 202*a* is connected to the first communication bus 10*a*. Under the control of a communication driver, the communication transceiver 202*a* transmits data from the communication circuit 206*a* into the first communication bus 10*a*, and receives data for input to the communication circuit 206a through the first communication bus 10a. The communication transceiver 202a thereby exchanges signals with the CGW 100.

The communication circuit 206a is connected to the communication transceiver 202a, and performs serial communication with the CGW 100 via the first communication bus 10a. The communication circuit 206a transmits data from the CPU 208a through the communication transceiver 202a, and inputs data input through the communication transceiver 202a to the CPU 208a.

The CPU 208a is an example of a hardware processor, and is connected to the communication circuit 206a and executes processing to control the overall first ECU 200a, including communication processing executed by the communication circuit 206a.

Figure 6:
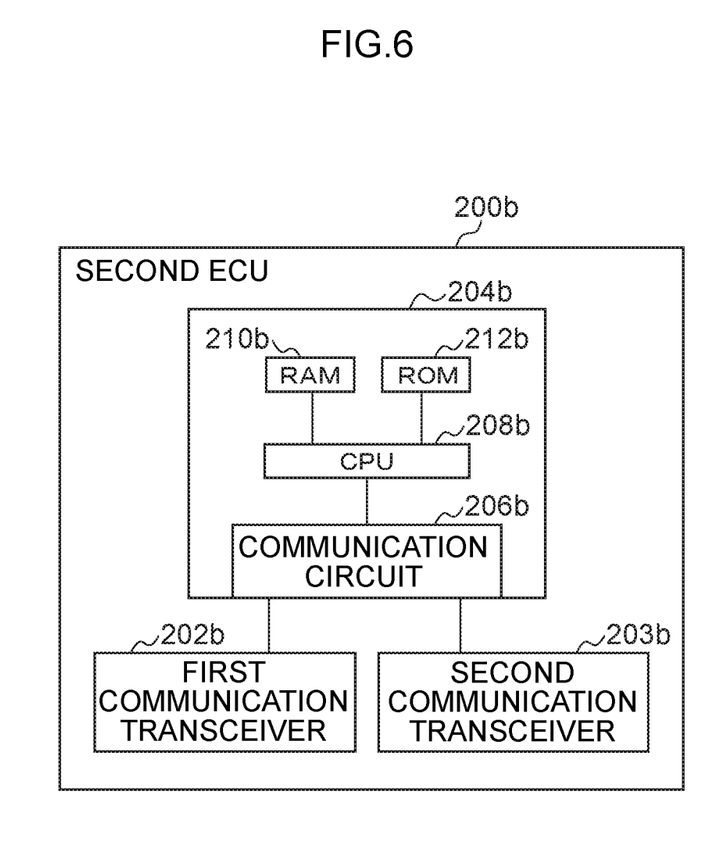
FIG. 6 is a diagram illustrating an example of a hardware configuration of a second ECU.

Next, explanation follows regarding a hardware configuration of the second ECU 200b.

FIG. 6 is a diagram illustrating an example of the hardware configuration of the second ECU 200b.

As illustrated in FIG. 6, the second ECU 200b includes a first communication transceiver 202b, a second communication transceiver 203b, and a microcontroller 204b. A communication circuit 206b, a CPU 208b, RAM 210b, and ROM 212b are installed to the microcontroller 204b. The CPU 208b controls the overall second ECU 200b. The RAM 210b is an example of memory, and is utilized as a work area for the CPU 208b when controlling the second ECU 200b. The ROM 212b stores a second ECU program executed by the CPU 208b.

The first communication transceiver 202b is connected to the second communication bus 10b. Under the control of a communication driver, the first communication transceiver 202b transmits data from the communication circuit 206b into the second communication bus 10b, and receives data for input to the communication circuit 206b through the second communication bus 10b. The first communication transceiver 202b thereby exchanges signals with the CGW 100.

The second communication transceiver 203b is connected to the third communication bus 10c. Under the control of a communication driver, the second communication transceiver 203b transmits data from the communication circuit 206b into the third communication bus 10c, and receives data for input to the communication circuit 206b through the third communication bus 10c. The second communication transceiver 203b thereby exchanges signals with the third ECU 200c.

The communication circuit 206b is connected to the first communication transceiver 202b, and performs serial communication with the CGW 100 via the second communication bus 10b. The communication circuit 206b transmits data from the CPU 208b through the first communication transceiver 202b, and inputs data for input to the CPU 208b through the first communication transceiver 202b.

The communication circuit 206b is also connected to the second communication transceiver 203b, and performs communication with the third ECU 200c via the third communication bus 10c. The communication circuit 206b transmits data from the CPU 208b from the second communication transceiver 203b, and inputs data input from the second communication transceiver 203b to the CPU 208b.

The CPU 208b is an example of a hardware processor, and is connected to the communication circuit 206b and executes processing to control the overall second ECU 200b, including communication processing executed by the communication circuit 206b.

Next, explanation follows regarding operation of the onboard system 1.

Figure 7:
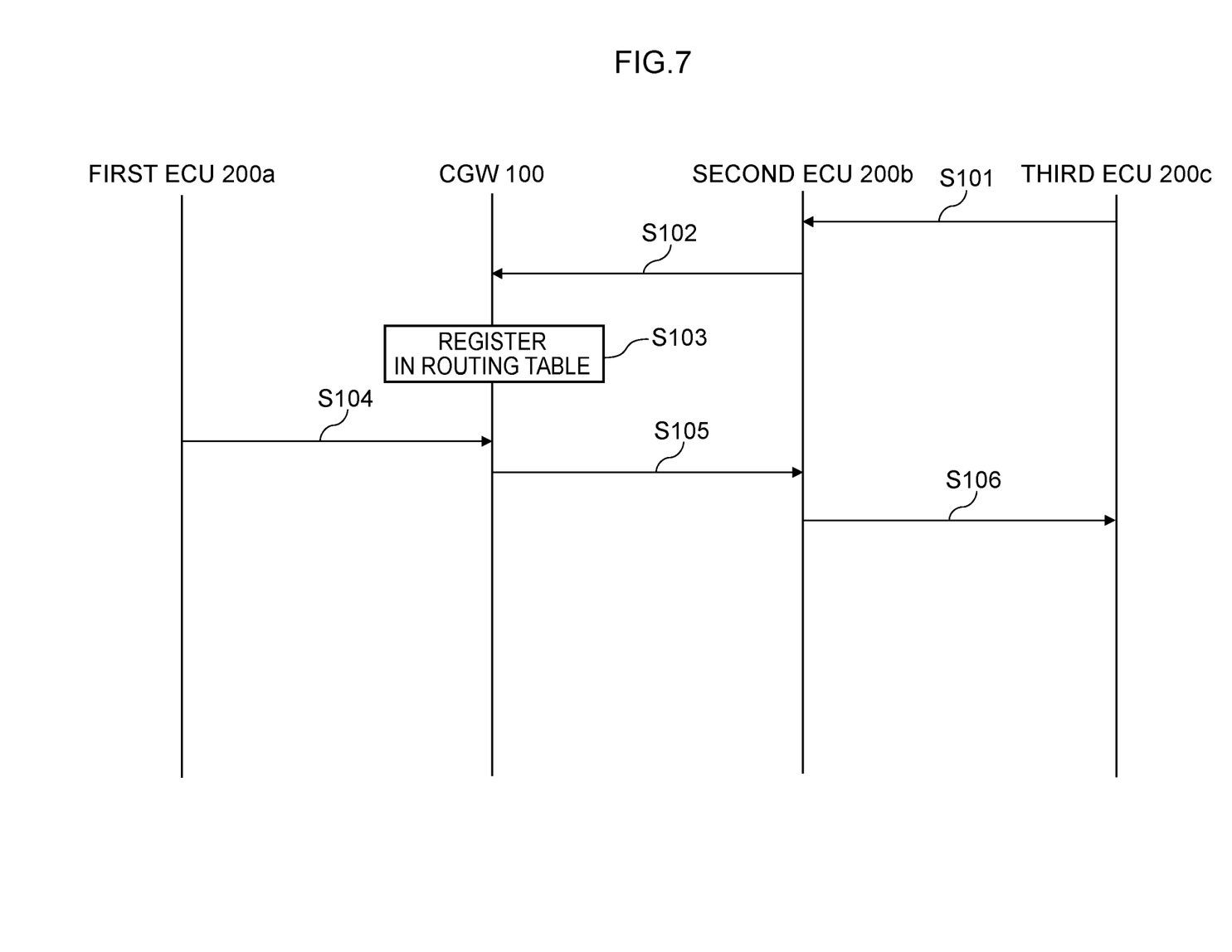
FIG. 7 is a sequence chart illustrating an example of operation of an onboard system.

FIG. 7 is a sequence chart illustrating an example of operation of the onboard system 1. The processing illustrated in FIG. 7 is performed when the CPU 108 of the CGW 100 reads the gateway program from the ROM 112, and expands and executes the gateway program in the RAM 110.

In the example illustrated in FIG. 7, first, through the third communication bus 10c, the third ECU 200c transmits a request to the second ECU 200b for a service that is communicated using the first communication bus 10a (step S101). This request for a service communicated using the first communication bus 10a that is transmitted from the third ECU 200c includes information (such as the CAN ID) regarding the CAN signal that the third ECU 200c wants to be routed from the first communication bus 10a.

On receiving the service request from the third ECU 200c, the second ECU 200b performs periodic transmission of remote frames to the CGW 100 (step S102). The information (such as the CAN ID) regarding the CAN signal that the third ECU 200c wants to be routed from the first communication bus 10a is included in the remote frames transmitted from the second ECU 200b at step S102.

Figure 8:
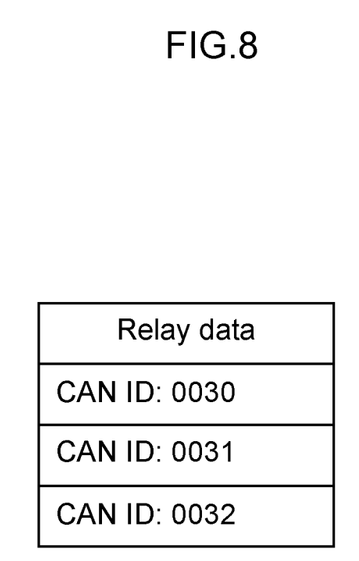
FIG. 8 is a diagram illustrating an example of information stored in a storage section of a CGW.

On receiving the remote frames periodically transmitted from the second ECU 200b, the CPU 108 of the CGW 100 stores the CAN signal information included in the remote frames in the routing table (step S103). As described previously, the routing table is stored in the storage section 124. FIG. 8 is an example of information in the routing table after the CAN signal information has been stored at step S103.

Following on from step S103, a CAN signal is transmitted from the first ECU 200a to the CGW 100 through the first communication bus 10a (step S104). If the signal transmitted at step S104 is a signal that has been registered in the routing table, the CPU 108 of the CGW 100 transmits the signal from the first ECU 200a to the second ECU 200b through the second communication bus 10b (step S105).

On receiving the signal transmitted from the CGW 100 through the second communication bus 10b, the second ECU 200b delivers the service to the third ECU 200c through the third communication bus 10c (step S106).

By executing the operation illustrated in FIG. 7, the CGW 100 of the onboard system 1 is capable of routing a signal communicated using the first communication bus 10a to the second communication bus 10b.

Figure 9:
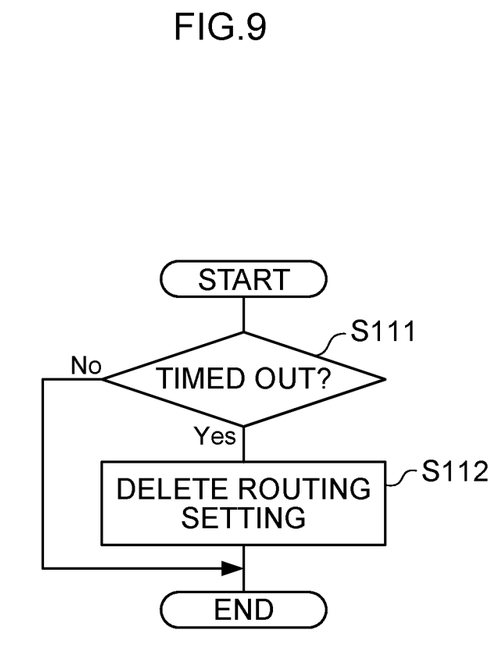
FIG. 9 is a flowchart illustrating an example of operation of a CPU of a CGW.

The CPU 108 of the CGW 100 may delete information that has been registered in the routing table in response to remote frames from the second ECU 200b in cases in which a remote frame has not been received from the second ECU 200b for a predetermined duration, namely in cases in which a Time to Live (TTL) has expired.

FIG. 9 is a flowchart illustrating such operation of the CPU 108 of the CGW 100.

The CPU 108 determines whether or not a predetermined duration has elapsed since receiving a remote frame from the second ECU 200b, namely whether or not a timer has timed out (step S111).

In cases in which the determination result of step S111 is that the timer has timed out (step S111: Yes), the CPU 108 deletes from the routing table any routing settings that were stored in the routing table as a result of receiving the remote frames from the second ECU 200b (step S112). In cases in which a determination result of step S111 is that the timer has not yet timed out (step S111: No), the CPU 108 skips the processing of step S112.

Figure 10:
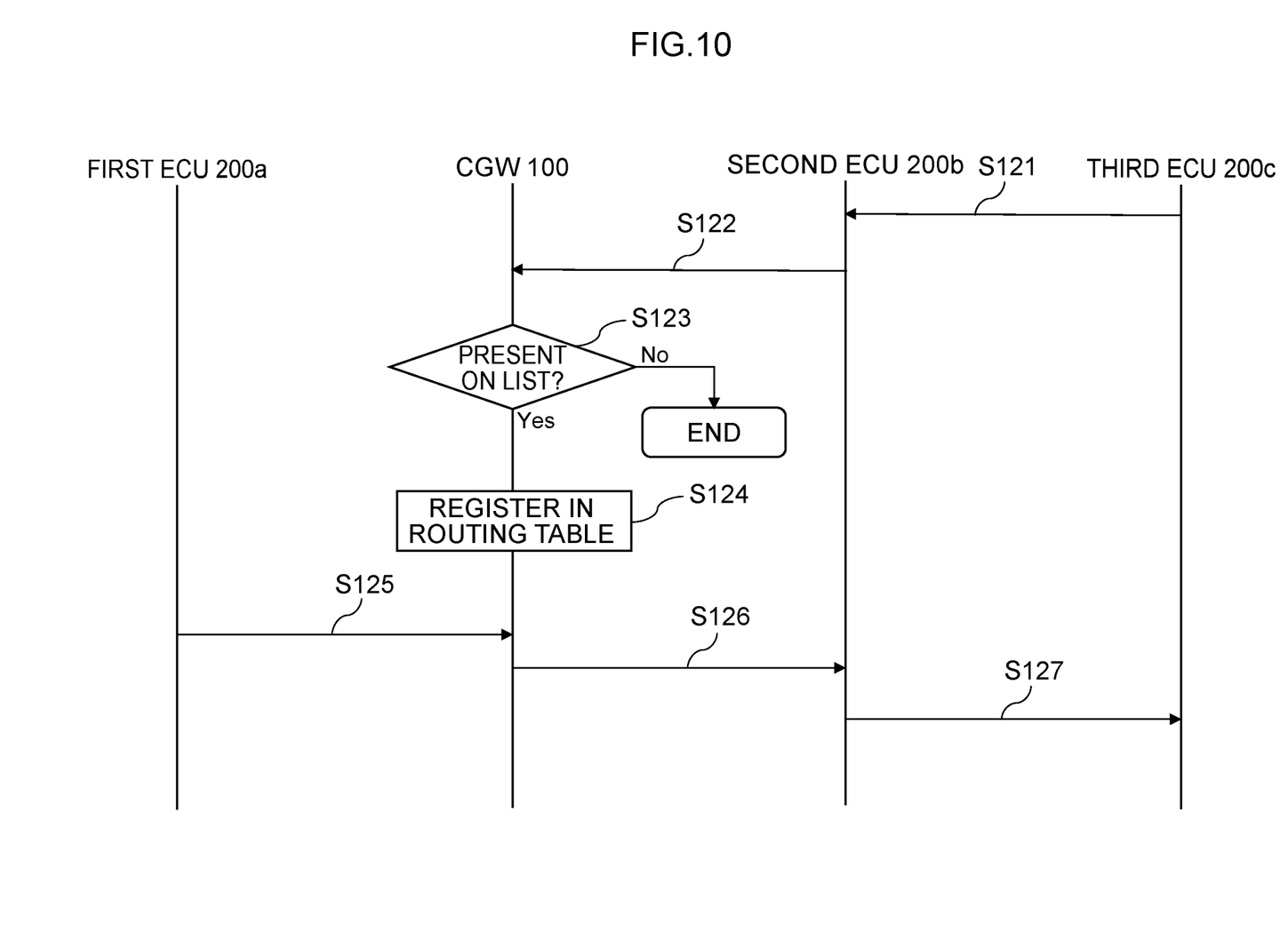
FIG. 10 is a sequence chart illustrating an example of operation of an onboard system.

On receiving a remote frame including CAN signal information from the second ECU 200b, the CGW 100 may determine whether or not the CAN signal includes predetermined data, for example whether or not the CAN signal is one that may be routed. Configuration may be made such that the CPU 108 stores the CAN signal information in the routing table in cases in which the CAN signal is one that may be routed, whereas the CPU 108 does not store the CAN signal information in the routing table in cases in which the CAN signal is not one that may be routed.

FIG. 10 is a sequence chart illustrating an example of such operation of the onboard system 1. The processing illustrated in FIG. 10 is performed when the CPU 108 of the CGW 100 reads the gateway program from the ROM 112, and expands and executes the gateway program in the RAM 110.

In the example illustrated in FIG. 10, first, the third ECU 200c transmits a request to the second ECU 200b for a service that is communicated using the first communication bus 10a using the third communication bus 10c (step S121). This request for a service communicated using the first communication bus 10a that is transmitted from the third ECU 200c includes information (such as the CAN ID) regarding the CAN signal that the third ECU 200c wants to be routed from the first communication bus 10a.

On receiving the service request from the third ECU 200c, the second ECU 200b performs a periodic transmissions of a remote frame to the CGW 100 (step S122). The information (such as the CAN ID) regarding the CAN signal that the third ECU 200c wants to be routed from the first communication bus 10a is included in the remote frames transmitted from the second ECU 200b at step S122.

On receiving the remote frames periodically transmitted from the second ECU 200b, the CPU 108 of the CGW 100 determines whether or not the CAN signal for which routing has been requested is a signal that may be routed to the second communication bus 10b (step S123). In order to make the determination of step S123, the CPU 108 may refer to a list of routable services that has been pre-stored in the storage section 124. In such cases, the CPU 108 determines that routing is possible if the service is present on the list, whereas the CPU 108 determines that routing is not possible if the service is not present on the list.

In cases in which the determination result of step S123 is that the CAN signal for which routing has been requested is not a signal that may be routed to the second communication bus 10b (step S123: No), the CPU 108 ends the processing outright.

In cases in which a determination result of step S123 is that the CAN signal for which routing has been requested is a signal that may be routed to the second communication bus 10b (step S123: Yes), the CPU 108 stores the CAN signal information included in the remote frames in the routing table (step S124).

Following on from step S124, a CAN signal is transmitted from the first ECU 200a to the CGW 100 through the first communication bus 10a (step S125). If the signal transmitted at step S125 is a signal that has been registered in the routing table, the CPU 108 of the CGW 100 transmits the signal from the first ECU 200a to the second ECU 200b through the second communication bus 10b (step S126).

On receiving the signal transmitted from the CGW 100 through the second communication bus 10b, the second ECU 200b delivers the service to the third ECU 200c through the third communication bus 10c (step S127).

By executing the operation illustrated in FIG. 10, the CGW 100 of the onboard system 1 is capable of routing a signal communicated using the first communication bus 10a to the second communication bus 10b in cases in which the signal is one that may be routed to the second communication bus 10b.

Although the CGW 100 provided to the onboard system 1 is given as an example of a control device in the above exemplary embodiment, the present disclosure is not limited to this example. The configuration of the CGW 100 may be similarly applied in a communication system in which a request for a signal is received through a communication bus that communicates using a different communication protocol to a communication protocol employed by a communication bus connected to a control device.

Note that the processing executed by the CPU reading and executing software (a program) in the above exemplary embodiment may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although the processing program is in a format pre-stored (installed) in the ROM or the storage in the above exemplary embodiment, there is no limitation thereto. The program may be provided in a format recorded on a non-transitory recording medium such as compact disc read only memory (CD-ROM), digital versatile disc read only memory (DVD-ROM), or universal serial bus (USB) memory. Alternatively, the program may be provided in a format downloadable from an external device through a network.

In consideration of the above circumstances, an object of the present disclosure is to provide a control device, an onboard system, a control method, and a non-transitory computer-readable recording medium that enable configuration content of communication to be relayed to be dynamically changed.

A first aspect of the disclosure is a control device that includes a memory, and a processor coupled to the memory, to a first communication bus, and to a second communication bus. The processor is configured to control whether or not to relay data communicated using the first communication bus to the second communication bus, and in a case in which a request has been received for data communicated using the first communication bus, execute switching so as to relay the data as received from the first communication bus to the second communication bus.

The control device of the first aspect executes switching so as to relay data received from the first communication bus to the second communication bus in a case in which a request has been received from a device connected to the second communication bus for data communicated using the first communication bus. The control device of the first aspect enables dynamic switching so as to relay data received from the first communication bus to the second communication bus.

A second aspect of the disclosure is the control device of the first aspect, wherein the memory is configured to store management information in which identification information for data communicated using the first communication bus is associated with information regarding whether or not to effect relay to the second communication bus, and the processor is configured to control whether or not to relay data communicated using the first communication bus to the second communication bus based on the management information.

The control device of the second aspect executes switching to relay data received from the first communication bus to the second communication bus based on the management information stored in the memory. The control device of the second aspect thus enables dynamic switching so as to relay data received from the first communication bus to the second communication bus based on the management information.

A third aspect of the disclosure is the control device of the second aspect, wherein in a case in which a request has been received for data communicated using the first communication bus, the processor is configured to update the management information such that data received from the first communication bus is relayed to the second communication bus.

The control device of the third aspect updates the management information stored in the memory in a case in which a request has been received for data communicated using the first communication bus. The control device of the third aspect thus enables the contents of the management information to be dynamically updated.

A fourth aspect of the disclosure is the control device of the second aspect, wherein in a case in which a request has been received for data communicated using the first communication bus, the processor is configured to not execute switching that would relay the data received from the first communication bus to the second communication bus if the data is predetermined data.

The control device of the fourth aspect does not relay data in a case in which a request relates to predetermined data. The control device of the fourth aspect thus enables control to be performed so as not to relay data in a case in which a request relates to predetermined data.

A fifth aspect of the disclosure is the control device of the fourth aspect wherein the processor is configured to not update the management information such that the predetermined data would be relayed.

The control device of the fifth aspect does not update the management information stored in the memory in a case in which a request relates to predetermined data. The control device of the fifth aspect thus enables control to be performed so as not to update the management information, such that data is not relayed in a case in which a request relates to predetermined data.

A sixth aspect of the disclosure is the control device of the first aspect, wherein the processor is configured to receive from the first communication bus, data identification information together with data communicated using the first communication bus, and receive from the second communication bus, information including the identification information and other data as the request for data communicated using the first communication bus.

The control device of the sixth aspect receives information including the data identification information and other data as the request for data communicated using the first communication bus. The control device of the sixth aspect therefore does not need to organize new identification numbers solely for the purpose of issuing a request.

A seventh aspect of the disclosure is the control device of the first aspect, wherein the control device is used in an onboard system The control device of the seventh aspect enables dynamic switching to relay data received from the first communication bus to the second communication bus in the onboard system.

An eighth aspect of the disclosure is an onboard system that includes the control device of the first aspect, a first electronic controller connected to the first communication bus, and a second electronic controller connected to the second communication bus, wherein in a case in which a request has been received from the second communication bus for data communicated using the first communication bus, the processor of the control device is configured to execute switching so as to relay the data as received from the first communication bus to the second communication bus The onboard system of the eighth aspect executes switching so as to relay the data as received from the first communication bus to the second communication bus in a case in which a request has been received from the second communication bus for data communicated using the first communication bus. The onboard system of the eighth aspect enables dynamic switching so as to relay data received from the first communication bus to the second communication bus.

A ninth aspect of the disclosure is a control method for causing a computer to execute processing, the processing that includes controlling whether or not to relay data communicated using a first communication bus to a second communication bus, and in a case in which a request has been received for data communicated using the first communication bus, executing switching so as to relay data received from the first communication bus to the second communication bus.

The control method of the ninth aspect executes switching so as to relay the data as received from the first communication bus to the second communication bus in a case in which a request has been received from a device connected to the second communication bus for data communicated using the first communication bus. The control method of the ninth aspect enables dynamic switching so as to relay data received from the first communication bus to the second communication bus.

A tenth aspect of the disclosure is a non-transitory computer-readable recording medium storing a program that is executable by a computer to perform processing, the processing that includes controlling whether or not to relay data communicated using a first communication bus to a second communication bus, and in a case in which a request has been received for data communicated using the first communication bus, executing switching so as to relay the data as received from the first communication bus to the second communication bus.

The non-transitory computer-readable recording medium of the tenth aspect executes switching so as to relay the data as received from the first communication bus to the second communication bus in a case in which a request has been received from a device connected to the second communication bus for data communicated using the first communication bus. The non-transitory computer-readable recording medium of the tenth aspect enables dynamic switching so as to relay data received from the first communication bus to the second communication bus.

The present disclosure is capable of providing a control device, an onboard system, a control method, and a non-transitory computer-readable recording medium that enable configuration content of communication to be relayed to be dynamically changed by executing switching so as to relay data as received from a first communication bus to a second communication bus in a case in which a request has been received from the second communication bus that is different to the first communication bus for data communicated using the first communication bus.

What is claimed is:

1. A control device, comprising:
a non-transitory memory; and
a processor coupled to the memory, to a first communication bus, and to a second communication bus, wherein
the memory stores first management information, in which (i) identification information for data communicated using the first communication bus is associated with (ii) information regarding whether or not to effect relay of the data to the second communication bus, and stores second management information, which specifies the identification information for data that is allowed to be relayed to the second communication bus, and
the processor is configured to:
control, based on the first management information and the second management information, whether or not to relay data communicated using the first communication bus to the second communication bus; and
when data communicated using the first communication bus has been received,
(i) in a case in which the received data is allowed to be relayed based on the second management information and is specified to be relayed based on the first management information, relay the received data to the second communication bus,
(ii) in a case in which the received data is allowed to be relayed based on the second management information and is not specified to be relayed based on the first management information, update the first management information to specify relay of the received data to the second communication bus and relay the received data to the second communication bus, and
(iii) in a case in which the received data is not allowed to be relayed based on the second management information, not relay the received data to the second communication bus.

2. The control device of claim 1, wherein:
data identification information is received by the processor together with the received data communicated using the first communication bus; and
the processor is configured to receive, from the second communication bus, information including the data identification information and other data as a request for data communicated using the first communication bus.

3. The control device of claim 1, wherein the control device is used in an onboard system.

4. An onboard system comprising:
the control device of claim 1;
a first electronic controller connected to the first communication bus; and
a second electronic controller connected to the second communication bus, wherein
in a case in which a request has been received from the second communication bus for data communicated using the first communication bus, the processor of the control device is configured to execute switching so as to relay data received from the first communication bus to the second communication bus.

5. A control method for causing a computer to execute processing, the processing comprising:
storing first management information, in which (i) identification information for data communicated using a first communication bus is associated with (ii) information regarding whether or not to effect relay of the data to a second communication bus;
storing second management information, which specifies the identification information for data that is allowed to be relayed to the second communication bus;
controlling, based on the first management information and the second management information, whether or not to relay data communicated using the first communication bus to the second communication bus; and
when data communicated using the first communication bus has been received,
(i) in a case in which the received data is allowed to be relayed based on the second management information and is specified to be relayed based on the first management information, relaying the received data to the second communication bus,
(ii) in a case in which the received data is allowed to be relayed based on the second management information and is not specified to be relayed based on the first management information, updating the first management information to specify relay of the received data to the second communication bus and relaying the received data to the second communication bus, and
(iii) in a case in which the received data is not allowed to be relayed based on the second management information, not relaying the received data to the second communication bus.

6. A non-transitory computer-readable recording medium storing a program that is executable by a computer to perform processing, the processing comprising:
storing first management information, in which (i) identification information for data communicated using a first communication bus is associated with (ii) information regarding whether or not to effect relay of the data to a second communication bus;
storing second management information, which specifies the identification information for data that is allowed to be relayed to the second communication bus;
controlling, based on the first management information and the second management information, whether or not to relay data communicated using the first communication bus to the second communication bus; and
when data communicated using the first communication bus has been received,
(i) in a case in which the received data is allowed to be relayed based on the second management information and is specified to be relayed based on the first management information, relaying the received data to the second communication bus,
(ii) in a case in which the received data is allowed to be relayed based on the second management information and is not specified to be relayed based on the first management information, updating the first management information to specify relay of the received data to the second communication bus and relaying the received data to the second communication bus, and
(iii) in a case in which the received data is not allowed to be relayed based on the second management information, not relaying the received data to the second communication bus.

* * * * *